Sept. 12, 1944.        M. E. LANGE ET AL        2,358,088
MACHINE TOOL
Filed Aug. 25, 1942        5 Sheets-Sheet 1

INVENTORS
MAX E. LANGE
MAX G. GOETZE
BY Kwis Hudson & Kent
ATTORNEYS

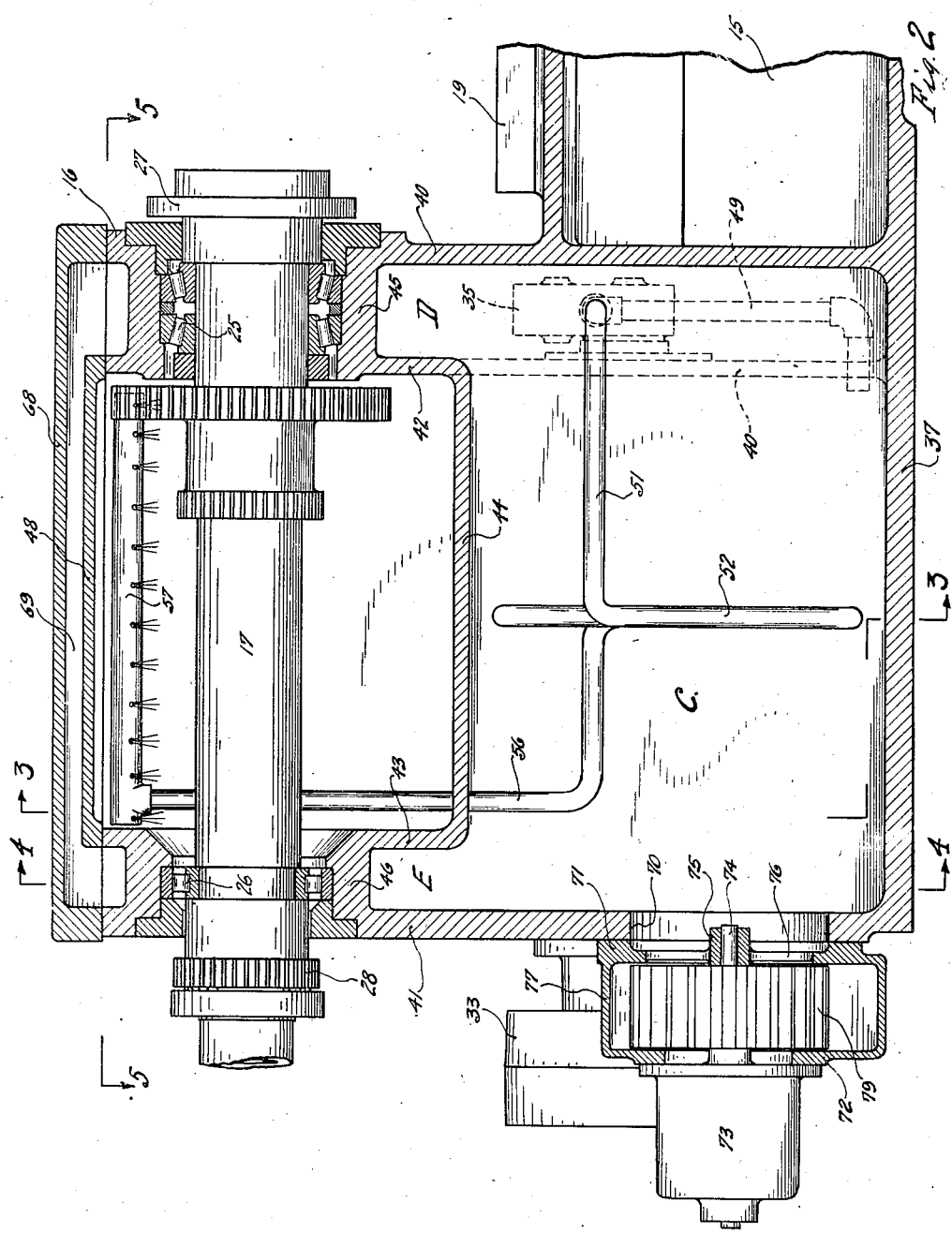

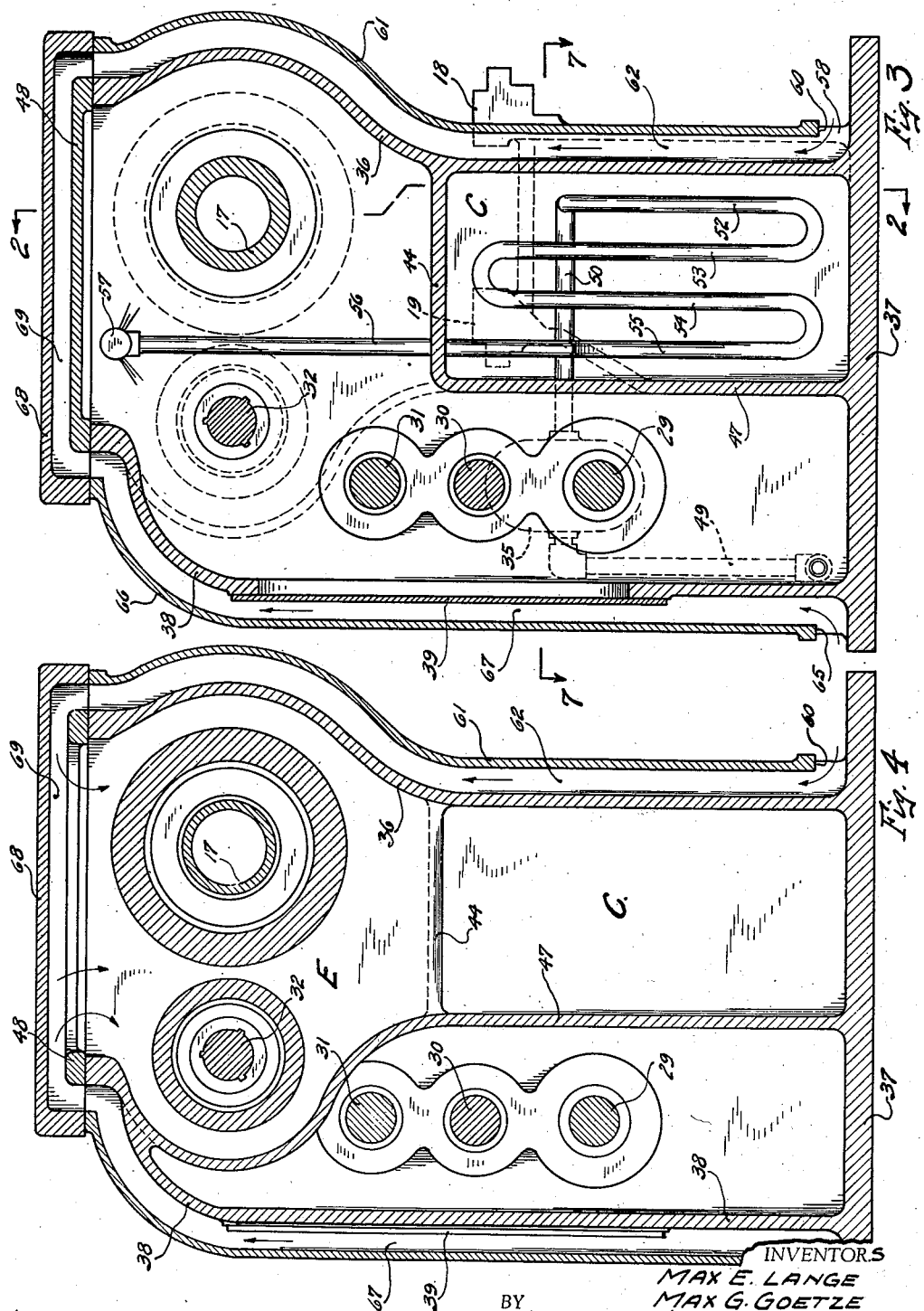

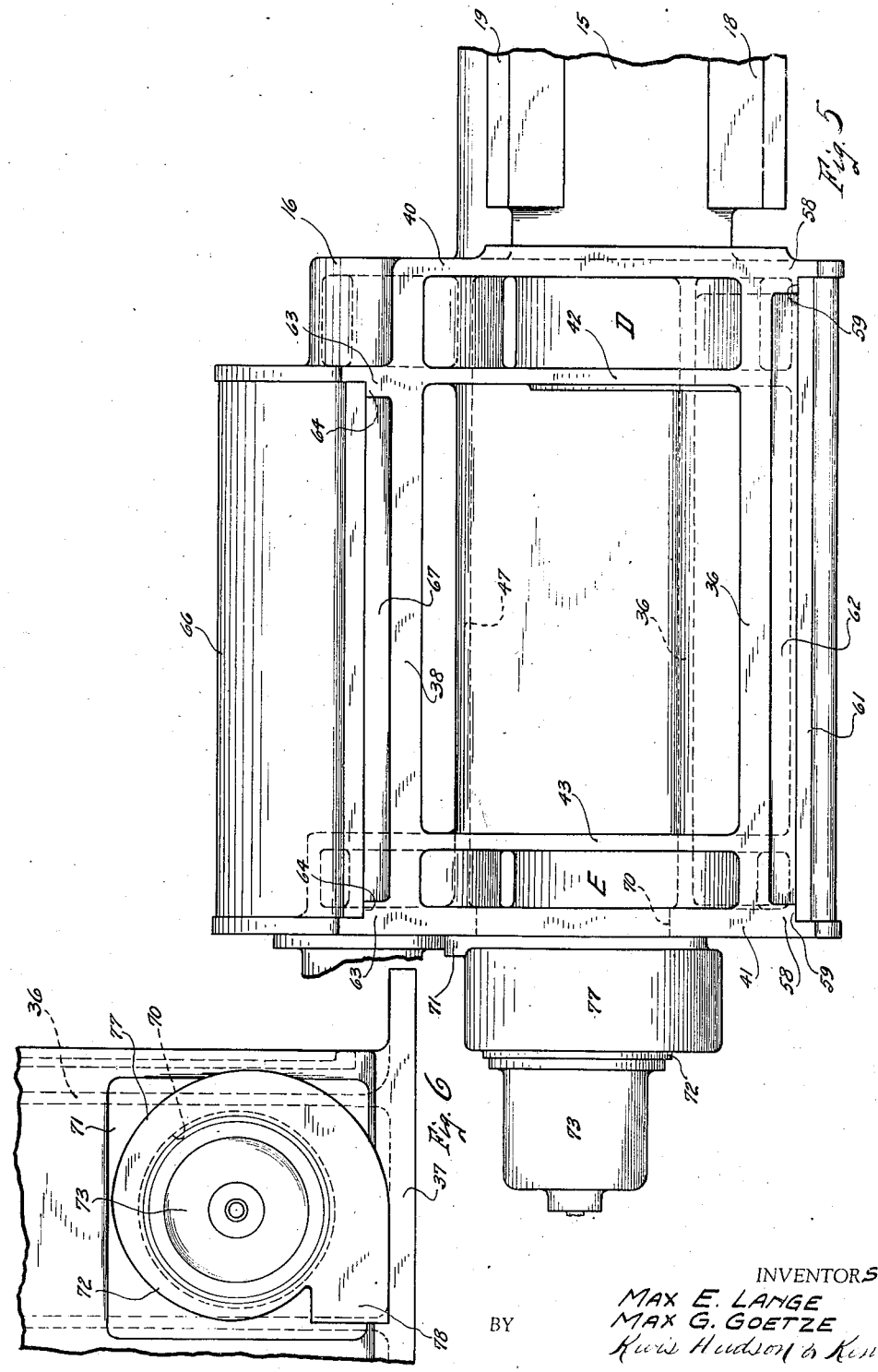

Sept. 12, 1944.    M. E. LANGE ET AL    2,358,088
MACHINE TOOL
Filed Aug. 25, 1942    5 Sheets-Sheet 5
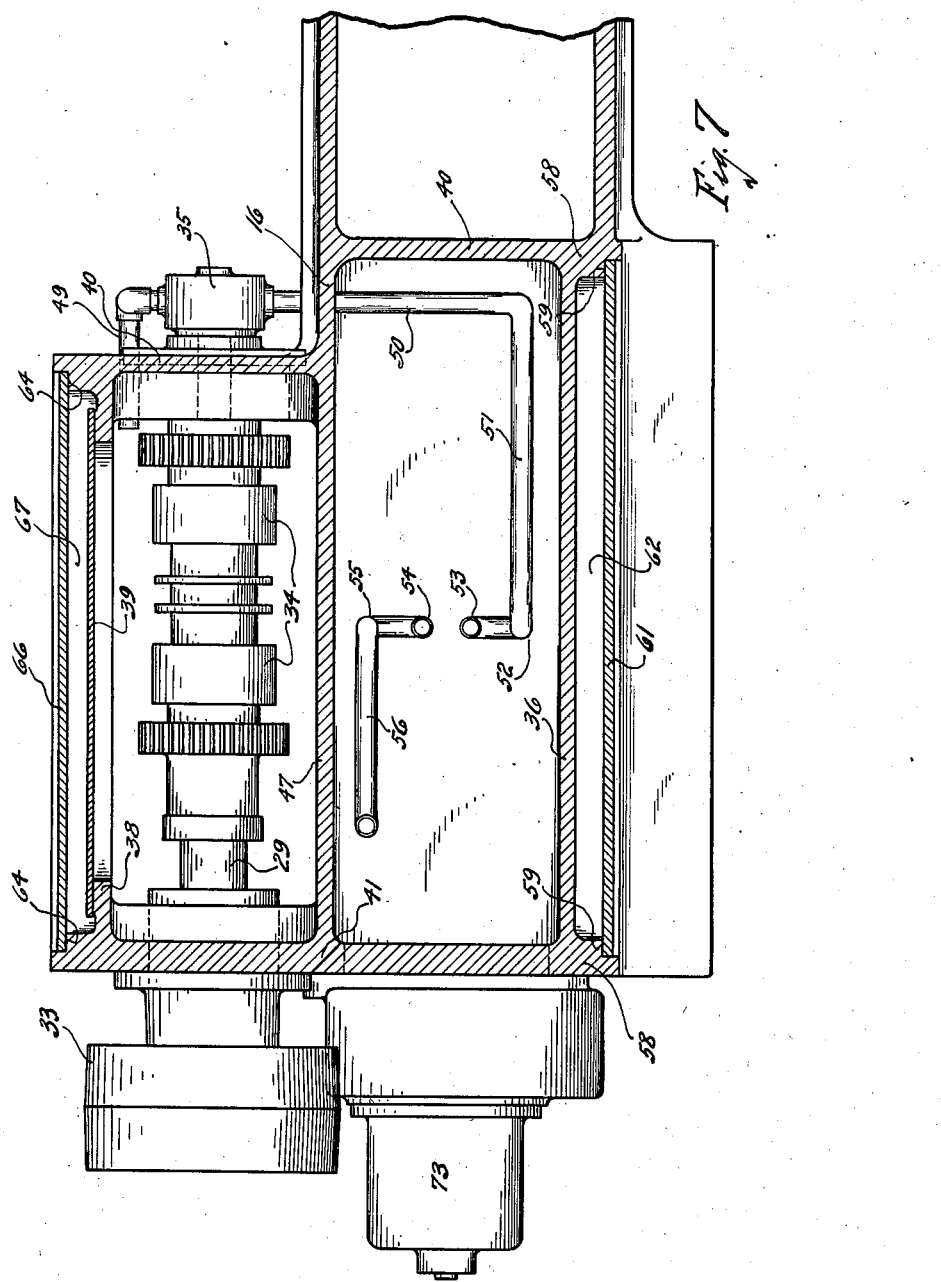
INVENTORS
MAX E. LANGE
BY  MAX G. GOETZE
Kwis Hudson & Kent
ATTORNEYS Patented Sept. 12, 1944

2,358,088

UNITED STATES PATENT OFFICE 2,358,088

MACHINE TOOL

Max E. Lange, Cleveland Heights, and Max G. Goetze, East Cleveland, Ohio, assignors to The Warner & Swasey Company, Cleveland, Ohio, a corporation of Ohio Application August 25, 1942, Serial No. 455,996

17 Claims. (Cl. 82—28)

This invention relates to a machine tool and particularly to a system for controlling the temperature of those parts of a machine tool which are subject to temperature changes during the operation of the machine.

Present day machine tools are operated at relatively high speeds due, at least in part, to the use therein of improved cutting tools. The use of these improved cutting tools makes it possible to maintain greater operating speeds under increased cutting pressures and greater thrust. This results in a tendency toward relatively large temperature changes occurring or developing in the operative parts of the machine and in the lubricant for such parts. The large temperature fluctuations in the various parts of the machine tool are apt to bring about expansion and contraction in varying degrees of the walls supporting the bearings for the movable parts and distortion in the various fixed parts, with the result that certain parts of the machine become misaligned with respect to other parts thereof, thereby decreasing the efficiency and accuracy of the machine. The heating of the lubricant will also result in heating certain portions of the walls of the machine with which it comes in contact while other portions of the machine walls are not affected by such temperature changes.

An object of the present invention is to provide in a machine tool, means for controlling the temperature variations of those parts of the machine tool which are subject to temperature changes by the operation of the machine, and particularly with respect to the bearing supports for the spindle and shafts and/or the lubricant for said bearings, spindle and shafts and the gearing and clutches arranged thereon that are located within the headstock of a machine tool.

Another object is to provide in a machine tool, means for stabilizing the temperature conditions of the various parts of the machine and eliminating rapid temperature changes in such parts between periods when the machine is operating and periods when the machine is inactive.

Another object is to provide in a machine tool, means for controlling the temperatures of the various parts of the machine to eliminate wide temperature differentials therein and thus to prevent distortion and misalignment of the parts which would cause a consequent reduction in the efficiency and accuracy of the machine.

Another object is to provide in a machine tool, means for controlling the temperatures of the headstock and thus maintain the movements of the slides in parallel relationship with the axis of the spindle.

A further object is to provide in a machine tool, means for controlling the temperatures of the various parts of the machine and wherein the temperature controlling medium flows substantially along the entire wall structure of the headstock to maintain the same at a substantially uniform temperature.

Another object is to provide in a machine tool, means for controlling the temperatures of the various parts thereof and which means includes provision for passing the controlling medium over the exterior surfaces of the machine and then through the interior thereof from which it is expelled to atmosphere.

A more specific object is to provide means for controlling the temperature of the headstock of a machine tool and which means includes provision for passing the controlling medium over and in contact with a substantial part of the exterior surface of the headstock and thence into the interior of the headstock and around the bearings for the operative parts and in temperature controlling relationship to the lubricant for said parts and thence to atmosphere.

A still further object is to provide in a machine tool, means for controlling the temperatures of various parts thereof and which means includes provision for insulating a substantial part of the exterior surface area of the machine whereby excessive transfer of heat to or from the machine is eliminated.

Another object is to provide in a machine tool, means controlling the temperatures of the various parts of the machine and which means includes provision for preventing rapid decrease in temperature of said parts during periods that the machine is idle.

Another object is to provide in a machine tool, means for controlling the temperatures of various parts of the machine and which means includes external and internal passages for the flow of a controlling medium therethrough, said external passages being defined by portions of the exterior surface of the machine and by removable members attached to the machine whereby the manufacture of the casting and the formation of the passages are facilitated and said exterior surface portions may be maintained in a clean condition.

Another object is to provide means such as defined in the last named object and wherein the removable members which define in part the external passages are formed of suitable thermal insulating material and thus prevent rapid heat transfer to or from the exterior surfaces of the machine.

A more specific object is to provide for the headstock of a machine tool, means for directing currents of air, preferably at room temperature, over the exposed exterior surfaces of the headstock and then directing said currents of air into the interior of the headstock to effect internal cooling of the headstock and the lubricant therein for the operative parts thereof.

Another object is to provide means for controlling the temperature of various parts of a machine tool and which means is of such character that the cooling medium contacts and acts upon maximum external and internal surface areas of the machine.

Another object is to provide in a machine tool means for controlling the temperature in the headstock before the lubricant reaches those parts of the machine it is to lubricate.

Further and additional objects and advantages residing in the invention and not hereinbefore specified will become apparent hereinafter during the following detailed description of an embodiment of the invention.

The invention is disclosed herein for purposes of illustration as embodied in the headstock of a turret lathe and with which it has special utility. However, it should be understood that the invention could be applied as well to other parts of a turret lathe and also to different parts or portions of various other types of machine tools.

The invention contemplates broadly the provision of external passages located in surrounding relationship to a part of a machine tool and which external passages are in communication with other passages located internally of said part, wherefore a cooling or temperature controlling medium, such as air, can be caused to flow through said passages; first over the exterior surfaces of the part of the machine tool and thence through the interior of said part and around the operative elements which in use generate high temperatures. The external and interior passages just referred to enable the cooling medium to contact maximum surface areas of the machine tool.

The invention further contemplates utilizing removable members or plates attached to the part and defining with the exterior surfaces of the part the external passages referred to. These removable plates preferably are formed of thermal insulating material, with the result that the temperature of the part of the machine tool which is to be controlled does not fluctuate rapidly and excessively between periods of the machine's operation and periods that the machine is idle.

The invention also contemplates the provision of means for positively circulating the cooling medium through the passages. Referring to the accompanying drawings illustrating an embodiment of the invention, Fig. 1 is a front elevational view of a turret lathe, to the headstock of which the invention has been applied.

Fig. 2 is a vertical longitudinal sectional view through the headstock and a portion of the bed of the turret lathe shown in Fig. 1 and on a larger scale than Fig. 1; said view being taken substantially along irregular line 2—2 of Fig. 3, looking in the direction of the arrows.

Fig. 3 is a vertical transverse sectional view through the headstock and is taken substantially on irregular line 3—3 of Fig. 2, looking in the direction of the arrows.

Fig. 4 is a vertical transverse sectional view through the headstock and is taken substantially on line 4—4 of Fig. 2, looking in the direction of the arrows.

Fig. 5 is a plan view of the headstock and a portion of the bed, with the headstock cover and the top removable passage defining member removed and with certain of the parts omitted; said view being taken substantially along line 5—5 of Fig. 2, looking in the direction of the arrows.

Fig. 6 is a fragmentary end elevational view of that portion of the headstock to which the means for circulating the temperature controlling medium is attached and is taken looking from the left hand side of Fig. 5, and Fig. 7 is a horizontal longitudinal sectional view through the headstock and is taken substantially on line 7—7 of Fig. 3, looking in the direction of the arrows.

Figure 1:
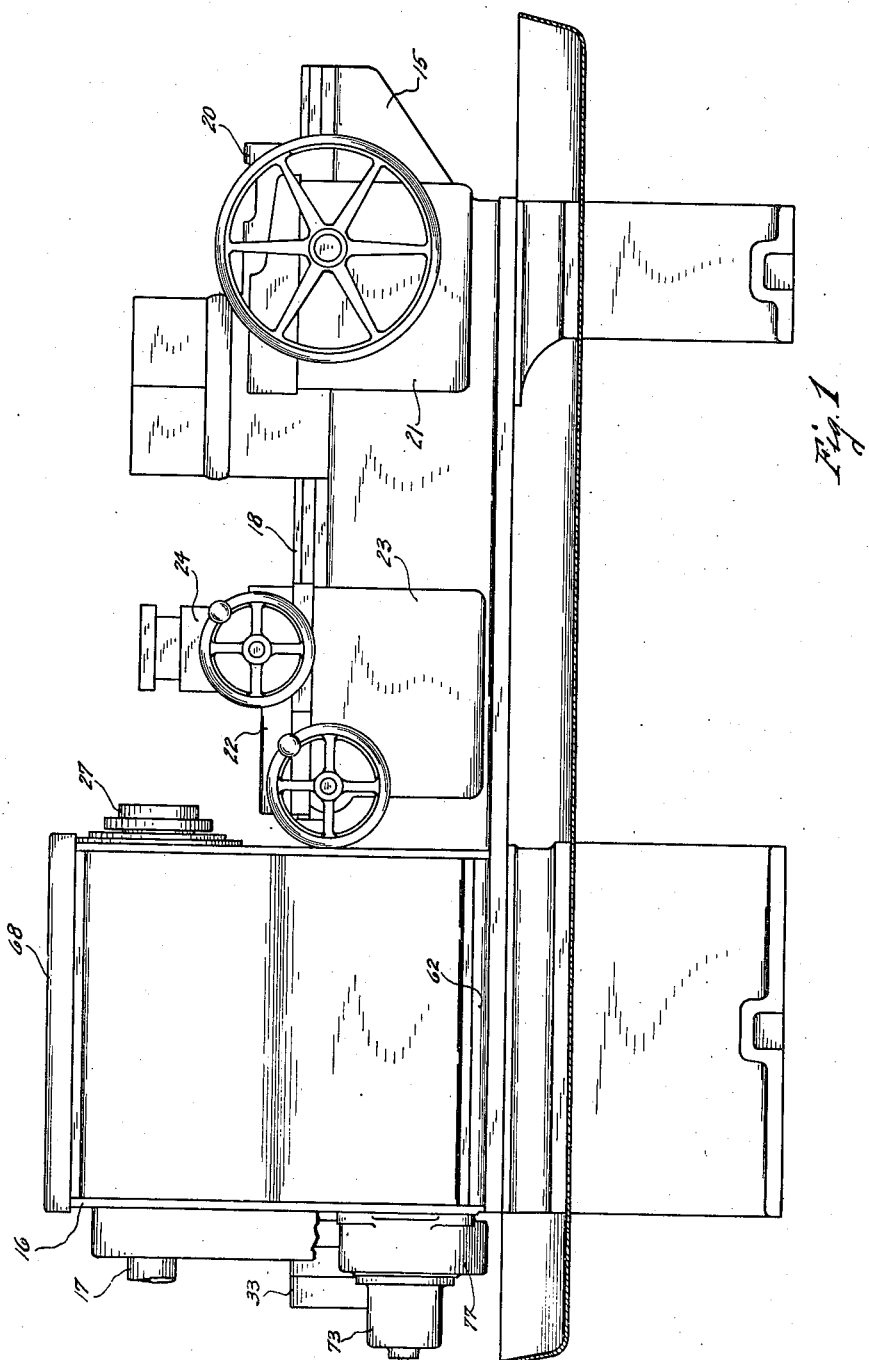

The turret lathe illustrated in the drawings comprises a bed 15, at one end of which is the headstock 16 which rotatably supports the work spindle 17. To the right of the headstock the bed is provided with longitudinally extending ways that are parallel to the axis of the work spindle 17 and consist of the front way 18 and rear way 19. The ways 18 and 19 slidably support a turret slide 20 having at the front of the machine a depending apron 21. The ways also slidably support intermediate the turret slide 20 and the headstock 16 a cross slide carriage 22 which is provided at the front of the machine with a depending apron 23. The cross slide carriage 22 slidably supports a cross slide 24. The general organization of the turret lathe just briefly described is well known in the art and further reference thereto is not deemed necessary.

The work spindle 17 at its right hand end, as viewed in Fig. 2, is rotatably supported in the headstock by means of an anti-friction radial and end thrust bearing 25 and at its left hand end by means of an antifriction radial bearing 26. The right hand end 27 of the work spindle 17, as viewed in Fig. 2, is shaped to support a work or tool holding chuck or device, while the left hand end of the spindle and externally of the headstock is provided with gearing indicated generally at 28 that is intermeshed with suitable gearing (not shown) in the drive to the feed shaft for the turret slide, cross slide carriage and cross slide, and which gearing is contained in a gear box (not shown) attached to the left hand end of the headstock, all as is well understood in the art.

The headstock rotatably supports in suitable bearings a main drive shaft 29 and said shaft drives the work spindle 17 through a suitable train of change speed gearing (not shown) arranged on shafts 30, 31 and 32, all of which shafts are mounted in suitable bearings likewise supported by the headstock walls, (see Figs. 3 and 4).

In the present illustration the main drive shaft 29 is operated by a pulley 33 fixed to the extended left hand end of said shaft, as viewed in Fig. 7, and driven by a belt (not shown) from a suitable source of power (also not shown). The drive to the work spindle from the shaft 29 is controlled by a double clutch 34 mounted on the shaft 29 and operated by a mechanism not shown. Since the exact details of the drive for the work spindle, that is, the arrangement of the change speed gearing, the clutches and the means for shifting the same form no part of the present invention, it appears to be unnecessary to describe them in greater detail herein and particularly since they are well known and understood in the art.

The main drive shaft 29 has its right hand end extended beyond the end wall of the headstock and to this extended end of the shaft there is operatively connected a pump 35 which circulates the lubricant for the shafts, bearings and gearing in the headstock, as will later be referred to.

The headstock 16 is preferably a substantially hollow metal casting having therein certain interior walls forming with the exterior walls supports for the bearings for the spindle and shafts and also forming passages and chambers as will be explained more fully hereinafter.

The headstock comprises a front wall 36 that includes an outwardly bowed or curved portion extending from the top of the headstock part way downwardly of the same and a straight portion extending downwardly from said curved portion and merging at its lower end into the bottom wall 37 of the headstock, as clearly shown in Figs. 3 and 4 and also as well understood in the art. The rear wall 38 of the headstock adjacent its upper end is rearwardly curved or bowed outwardly and then extends substantially vertically downwardly and merges with the bottom wall 37. The rear wall 38 is provided with an opening affording access to the gearing and clutch on the shafts 29, 30 and 31 and said opening is normally closed by a removable plate 39.

The headstock has a right hand end wall 40 and a left hand end wall 41 and said walls are connected at their lower ends to the bottom wall 37. The end wall 40 to the rear of the axis of the shaft 32 is deflected toward the left end of the headstock 16 and then connects with the rear wall 38. Spaced inwardly of the headstock from the end walls 40 and 41 and extending from the top of the headstock part way downwardly thereof are walls 42 and 43 which are interconnected at their lower ends by a horizontally extending wall 44 which latter wall has its front edge merging into and integral with the front wall 36 at the lower end of the outwardly curved portion thereof, as clearly shown in Figs. 3 and 4. Sleeve-like portions 45 and 46 are integral with the walls 40, 42 and 41, 43, respectively, and interconnect said walls and form the supports for the bearings 25 and 26 of the work spindle 17. The walls 40, 42 and 41, 43 also form the supports for the bearings for the shaft 32, while the bearings for the shafts 29, 30 and 31 are supported in bosses formed on the end walls 40 and 41 respectively.

The wall 44 is integral with a vertical interior wall 47 that extends longitudinally of the headstock and is connected at its opposite ends to the end walls 40 and 41. The front wall 36, bottom wall 37 and the walls 44 and 47 define a chamber C which has its opposite ends in communication with the space D that surrounds the bearing support 45 and the space E that surrounds the bearing support 46, as clearly shown in Fig. 2. A removable cover 48 is secured to the upper edges of the walls 42 and 43 and the upper edges of the front wall 36 and the rear wall 38, as clearly shown in Figs. 2, 3 and 4, and closes that part of the interior of the headstock which houses the shafts, clutch, gearing and spindle.

As previously stated, a lubricant pump 35 is operatively attached to the extended right hand end of the main drive shaft 29 and the intake side of this pump is connected by a conduit 49 to the interior of the headstock below the main drive shaft 29 and adjacent to the junction of the rear wall 38 with the end wall 40, as clearly shown in Figs. 2, 3 and 7. The outlet side of the pump 35 is connected to a horizontally extending conduit 50 which leads into the chamber C and then has a portion 51 that extends substantially at right angles and horizontally therefrom toward the end wall 41. The left hand end of the portion 51 of the conduit 50 joins a series of alternately downwardly and upwardly vertically extending lengths of conduit 52, 53, 54 and 55 located substantially midway of the chamber C between the ends walls 40 and 41 and constituting a radiator through which the lubricant flows. The length of conduit 55 joins at its upper end an L-shaped length of conduit 56, the free end of the short arm of which is connected to the length 55 and is substantially horizontal, while the long arm thereof extends vertically upwardly through the wall 44 and passes between the work spindle 17 and the shaft 32.

The upper end of the long vertical arm of the L-shaped length of conduit 56 is connected to one end of a lubricant discharge member 57 which extends horizontally and longitudinally of the headstock and is in the form of an elongated closed cylinder provided with a plurality of spaced outlet openings through which the lubricant is sprayed or cascaded to fall by gravity over the work spindle 17, shafts 32, 31, 30 and 29 and the gearing carried by said spindle and shafts and from which the lubricant flows through the various bearings. The lubricant thus emanating from the member 57 flows by gravity into the lower part of the headstock beneath the main drive shaft 29 where it is again drawn into the intake conduit 49 and recirculated by the pump 35.

At the junction of the front wall 36 with the end walls 40 and 41 (see Fig. 5), the headstock is provided with ribs or flanges 58 projecting outwardly from the front of the headstock and extending vertically downwardly thereof from the top of the headstock to an outward extension of the bottom wall 37 thereof.

The ribs 58 on their inner and adjacent sides are provided with shoulders 59 which extend from the top of the ribs downwardly thereof to a short distance above the lower end of the ribs to provide horizontally extending supporting surfaces 60 (see Fig. 3). A member 61 shaped similarly to the front wall 36 is removably secured against the shoulders 59 of the ribs or flanges 58 and is supported by the supporting surfaces 60 adjacent the lower end of the ribs as clearly indicated in Figs. 3, 4, 5 and 7. The front wall 36 and a member 61 spaced therefrom define a passage or space 62 which is exterior of the headstock and is coextensive with the front surface of the latter. The passage 62 is in communication with atmosphere at its lower end due to the opening provided between the lower edge of the member 61 which rests on the supporting surfaces 60 and the extended portion of the bottom wall 37 of the headstock.

The junctions of the rear wall 38 with the end walls 40 and 41 are provided with flanges or ribs 63 similar to the ribs 58 and projecting rearwardly of the headstock and extending vertically downwardly of the same from the top to merge with a rear extension of the bottom wall 37 (see Fig. 5). The ribs 63 follow the contour of the rear wall 38 and are provided with shoulders 64 extending downwardly from the top thereof on the adjacent sides of the ribs 63 and terminating above the bottom wall 37 of the headstock to provide horizontally extending supporting surfaces 65 (see Fig. 3). A member 66 shaped similarly to the rear wall 38 is removably secured to the shoulders 64 and the supporting surfaces 65 in spaced relationship to the rear wall 38 so as to define with said rear wall a passage or space 67 that is substantially coextensive with the exterior surface at the rear of the headstock. The passage 67 communicates at its lower end with atmosphere through the space between the lower edge of the member 66 and the extended portion of the bottom wall 37 of the headstock.

A removable cover member 68 has its downwardly extending peripheral flange bearing upon and secured to the upper ends of the end walls 40 and 41 and the upper edges of the removable front and rear members 61 and 66, as clearly shown in Figs. 2, 3 and 4. The cover member 68 defines with the cover 48 a passage or space 69 exteriorly of the top of the headstock and communicating at its opposite ends with the spaces D and E that surround the bearing supports 45 and 46 and which spaces communicate with the chamber C. The spaces or passageways D and E are shown as of different widths, since preferably the said passageways are proportioned in accordance with the heat developed by the respective bearings located in the passageways. The passage 69 along its front and rear ends is in communication with the front passage 62 and the rear passage 67, respectively, as clearly indicated in Figs. 3 and 4.

The removable members 61 and 62 and the removable cover member 68 may be formed of any suitable material, but preferably these members are made of a material possessing good thermal insulating properties, such for example as suitable plastic material. The use of thermal insulating plastic material for the members 61, 66 and 68 is advantageous, since the exterior front and rear walls and the top of the headstock are thereby protected from sudden drafts of air and are insulated with respect to atmosphere, thus obviating rapid heat transfer to or from the exterior surfaces of the headstock. Consequently there is not a rapid exchange of heat from the headstock to atmosphere during periods of time that the machine is inactive after it has been in operation as, for example, those periods occurring between changing shifts of operators, the lunch period, loading or set-up periods, or any other period when the machine may be idle temporarily. The temperature of the headstock may, therefore, be maintained substantially stable and thus the disadvantages of rapid temperature changes in the parts of the headstock are avoided.

In the particular embodiment illustrated and described herein the end walls of the headstock are not shown as defining with removable insulating members external passages, but it should be understood that such an arrangement is within the contemplation of the invention if necessary or desirable for the proper control of the temperature of the headstock.

As previously explained the invention envisages the provision of external passages through which a cooling medium may flow in contact with a substantial exterior surface area of the headstock. These external passages may be coextensive with the front and rear walls and the top of the headstock, as shown herein, or if necessary or desirable such passages, in addition, could be coextensive with the end walls of the headstock.

The end wall 41 adjacent the lower portion thereof and near the front wall 36 of the headstock is provided with an opening 70 which communicates with the chamber C adjacent to the bottom of the latter (see Figs. 2 and 6). A supporting bracket 71 is secured to the exterior of the end wall 41 of the headstock in surrounding relationship to the opening 70. The bracket 71 at its outer end is provided with a radially inwardly extending flange 72 which defines an opening concentric to the opening 70 but of smaller diameter. The flange of a motor 73 is secured to the outer side of the radially inwardly extending flange 72 of the bracket 71 and said motor has its shaft 74 extended through the opening defined by the flange 72 and centrally into the opening 70 in the end wall 71. The inner or extended end of the motor shaft 74 is rotatably supported by a bearing boss 75 integral with the inner ends of radial arms 76, in turn, integral with the bracket 71, as clearly shown in Fig. 2. The supporting bracket 71 and the flange 72 are interconnected by a housing portion 77, the circumference of which is of spiral contour, as clearly indicated in Figs. 2 and 6. The interior of the bracket is in communication with atmosphere through an outlet portion 78 which is a continuation of the spiral circumference of the housing portion of the bracket and is located at the lower side of the bracket adjacent to the bottom wall 37 of the headstock, see Fig. 6. A suitable fan-wheel 79 is fixed on the motor shaft 74 within the bracket, as clearly indicated in Fig. 2, and the purpose of this fan will presently become clear.

When the machine is operating lubricant is being circulated by the pump 35 through the intake conduit and then from the pump through the conduit 50 and the radiator forming conduit portions 51, 52, 53, 54 and 55 in the chamber C and thence through the L-shaped length of conduit 56 to the lubricant discharge member 57 from which it is sprayed or cascaded over the work spindle and shafts, the bearings therefor and the gearing in the headstock and flows by gravity to the lower part of the interior of the headstock beneath the main drive shaft 29.

Assuming that the motor 73 is operating and the fan 79 revolving with the motor shaft 74 in a direction to draw air from the chamber C into the housing bracket and discharge the same to atmosphere through the outlet portion 78, it will be seen that a circulation of air will be created and the same will be drawn into the front exterior passage 62 and the rear exterior passage 67 through the openings at the lower ends of said passages adjacent to the bottom wall 37 of the headstock. The air thus drawn in to the external passages 62 and 67 will be the relatively cool air adjacent the floor of the room in which the machine is located. This relatively cool air will flow upwardly through the exterior passages 62 and 67 in contact with the exterior surfaces of the front wall 36 and the rear wall 38 of the headstock and will act to cool said walls. The air will then flow from the exterior passages 62 and 67 into the exterior top passage 69 from which it flows into the spaces D and E and around the supports 45 and 46 for the front and rear bearings of the work spindle 17 and around the supports for the bearings of shaft 32. The circulating air then flows from the spaces D and E into the chamber C and across and around the conduits for the lubricant, particularly those lengths of conduits constituting the radiator as previously referred to. The air is then drawn from the chamber C by the fan 79 and discharged through the outlet 78 to atmosphere.

In other words, cool air is first circulated through the exterior passages in contact with substantial exterior surface areas of the headstock as indicated by the arrows, thereby cooling the outer walls of the headstock. The circulating medium after it has been somewhat warmed by its circulation through the exterior passages then flows, as indicated by the arrows, interiorly of the headstock and around the supports for the bearings for the work spindle and shaft to lower the temperature of the same, from which it passes around the conduits for the circulating lubricant and cools the temperature of the lubricant flowing through said conduits.

In this way the temperature of the outer walls of the headstock, the temperature of the interior of the headstock including the bearing supports and the temperature of the lubricant chamber as well as the temperature of the lubricant, are controlled, with the result that distortion in the various parts of the headstock due to excessive temperature fluctuations is avoided. The control of the temperatures of the various parts of the headstock, and particularly of the bearing supports for the work spindle, imparts operating stability to the machine as such parts do not become misaligned due to distortion occasioned by expansion or contraction and the work spindle is maintained in parallelism with the ways of the bed of the machine in both horizontal and vertical planes. The use of the removable members made of insulating material to define with the outer walls of the headstock the exterior passages prevents the headstock from being subject to external cooling by drafts of air which might cause sudden expansion or contraction of various parts of the headstock.

As already referred to, the removable members are preferably formed of insulating material and therefore act to prevent rapid cooling off of the headstock during periods that the machine is inactive after periods of activity. The removable members provide ready access when removed, to the exterior surfaces of the headstock for purposes of cleaning the same and maintaining the exterior passages free of grease, dirt or other foreign matter. The use of the removable members also facilitates the manufacture of the headstock casting and the provision of passages therein.

Although a preferred embodiment of the invention has been illustrated and described herein, it should be understood that the invention is susceptible of various modifications and adaptations within the scope of the appended claims.

Having thus described our invention, we claim:

1. In a machine tool having a portion the temperature of which is to be controlled and which portion includes exterior walls and interior walls defining internal passages in said portion and forming bearing supports for the bearings of movable parts, means located in certain of said interior passages and through which lubricant is circulated, means operatively associated with certain of the exterior walls of said portion and defining therewith exterior passages in communication with said interior passages, and means for circulating a temperature controlling medium through said exterior passages and said interior passages to control the temperature of said portion, bearings and said lubricant.

2. In a machine tool having a portion the temperature of which is to be controlled and which portion includes exterior walls and interior walls defining internal passages in said portion and forming bearing supports for the bearings of movable parts, means operatively associated with said portion and located exteriorly thereof in spaced relation to certain of said exterior walls and defining with the latter exterior passages embracing said portion and communicating with said internal passages, said portion and said means having cooperating parts defining inlet openings to said external passages and adjacent the lower part of the latter, said portion adjacent its lower end being provided with an outlet opening communicating with said internal passages, and means for positively circulating fluid through said inlet openings, said external passages, said internal passages and out through said outlet opening.

3. In a machine tool having a headstock provided with exterior walls and with interior walls defining internal passages in the headstock, bearing supports connected with certain of said external and internal walls and located in said internal passages, means operatively associated with certain of said external walls and defining therewith external passages in communication with said internal passages, and means for circulating fluid through all of said passages and around said bearing supports.

4. In a machine tool, a headstock including external walls and internal walls defining internal passages, bearing supports connected with certain of said walls interiorly of the headstock and located in said passages, means for circulating lubricant through said headstock and including a lubricant conduit located in an internal passage, means operatively associated with certain of said external walls and defining therewith exterior passages communicating with said interior passages and substantially embracing said headstock, and means for drawing fluid into said external passages, circulating the same therethrough and through said internal passages and thence expelling the same.

5. In a machine tool having a headstock and a bed provided with ways extending longitudinally from said headstock, said headstock being provided with external walls and internal walls defining internal passages therein and connected with bearing supports located in said passages, a work spindle mounted in bearings carried by said supports and parallel to said ways, means for driving said spindle including shafting and gearing, means for circulating lubricant over said spindle, shafting and gearing and including a lubricant conduit having a radiator located in one of said passages, certain of said exterior walls outwardly of the headstock being provided with supporting means, members removably attached to said supporting means in spaced relation to the exterior of said headstock and defining therewith an external passage substantially embracing said headstock, said external passage and said internal passages being in communication, and means for circulating fluid first through said external passage and then through said internal passages around said bearings and radiator and outwardly of the headstock to control the temperature of said bearings and lubricant and thus maintain the parallelism of the spindle and ways.

6. In a machine tool having a headstock provided with external walls and internal walls defining internal passages therein and connected with bearing supports located in said passages, said walls also defining a lubricant chamber, means for circulating lubricant through said chamber and including a lubricant conduit having a radiator located in one of said passages, certain of said exterior walls outwardly of the headstock being provided with supporting means, members removably attached to said supporting means in spaced relation to the exterior of said headstock and defining therewith an external passage substantially embracing said headstock, said external passage and said internal passages being in communication, and means for circulating fluid through said external passage and then through said internal passages around the bearings, said lubricant chamber and said radiator and outwardly of the headstock.

7. In a machine tool having a movable part, a support for said part and having a chamber the ends, sides and top of which are included by spaced double walls defining intercommunicating passages, certain of said double walls supporting the bearings for said part, and means for circulating a temperature controlling medium through said passages.

8. In a machine tool having a movable part, a support for said part and having a chamber the ends, sides, top and bottom of which are substantially included by spaced double walls defining passages, certain of said double walls supporting the bearings for said part, the passages at the sides of said chamber communicating with the passage at the top thereof while the latter passage communicates with the passages at the ends of said chamber and said last passages communicate with the passage at the bottom of the said chamber, and means for circulating a temperature controlling medium through said passages.

9. In a machine tool having a movable part and a transmission, a support for said part and having a chamber housing said transmission and the ends, sides, top and bottom of which chamber are substantially included by spaced double walls defining passages, the spaced walls at the ends of said chamber supporting the bearings for said part, the passages at the sides of said chamber communicating with the passage at the top thereof and the latter communicating with the passages at the ends of said chamber and these last passages communicating with the passage at the bottom of the chamber, and means for circulating fluid through said passages.

10. In a machine tool having a movable part and a transmission, a support for said part and having a chamber housing said transmission with the ends, sides, top and bottom of said chamber substantially included by spaced double walls defining passages, the spaced walls at the ends of said chamber supporting the bearings for said part, the passages at the sides of said chamber communicating with the passage at the top thereof and the latter communicating with the passages at the ends of said chamber and these last passages communicating with the passage at the bottom of the chamber, said support being provided with inlet openings to said passages at the sides of said chamber and with an outlet opening from said passage at the bottom of said chamber, and means for circulating fluid through said inlet openings, said passages and said outlet opening.

11. In a machine tool of the type having a headstock for a rotatable spindle and containing therein gearing for driving said spindle and shafting for said gearing, said headstock having a chamber housing said spindle, gearing, and shafting, with its ends, sides, top and bottom substantially included by spaced double walls defining passages, the spaced walls at the ends of said chamber supporting bearings for said spindle, means for lubricating said bearings, gearing and shafting, the passages at the sides of said chamber communicating with the passage at the top thereof and the latter communicating with the passages at the ends of said chamber and these last passages communicating with the passage at the bottom of the chamber, and means for circulating fluid through said passages.

12. In a machine tool having a headstock provided with exterior walls and with interior walls defining internal passages in the headstock, bearing supports for a movable part connected with certain of said external and internal walls and located in said internal passages, said headstock being provided with outwardly extending supporting portions, and members detachably secured to said supporting portions and substantially coextensive with certain of said external walls and defining therewith external passages in communication with said internal passages, and means for circulating fluid through all of said passages and around said bearing supports.

13. In a machine tool having a headstock provided with exterior walls and with interior walls defining internal passages in the headstock, bearing supports for a movable part connected with certain of said external and internal walls and located in said internal passages, said headstock having externally located supporting portions, and members detachably secured to said supporting portions and substantially coextensive with certain of said external walls and defining therewith external passages in communication with said internal passages, said members being formed of non-metallic material having thermal insulating properties, and means for circulating fluid through all of said passages and around said bearing supports.

14. In a machine tool having a movable part, a support for said part and having a chamber the ends, sides, and top of which are included by spaced double walls defining intercommunicating passages certain of said double walls supporting the bearings for said part, the bottom wall of said chamber and the base of said support defining a lower chamber communicating with said passages, and means for circulating a temperature controlling medium through said passages.

15. In a machine tool having a movable part, a support for said part and having a chamber the ends, sides, and top of which are included by spaced double walls defining intercommunicating passages, certain of said double walls supporting the bearings for said part, the outer walls of certain of said double walls of said chamber being formed of non-metallic material having thermal insulating properties, and means for circulating a temperature controlling medium through said passages.

16. In a machine tool having a movable part and a transmission, a support for said part and having a chamber housing said transmission with the ends, sides, and top of said chamber substantially included by spaced double walls defining passages, the spaced walls at the ends of said chamber supporting the bearings for said part, the outer walls of the double walls at the sides of said chamber being formed of non-metallic material having heat insulating properties, the passages at the sides of said chamber communicating with the passage at the top thereof and the latter communicating with the passages at the ends of said chamber and these last passages communicating with the passage at the bottom of the chamber, said support being provided with openings to said passages at the sides of the chamber and with an opening to said passage at the bottom of said chamber, and means for circulating fluid through said openings and passages.

17. In a cooling system for a machine tool having a movable part, a support for said part having a chamber the ends, sides and top of which are included by spaced double walls defining intercommunicating passages, certain of said double walls supporting the bearings for said part, the passages in which said bearings are located having a volumetric capacity for the passage of a temperature controlling medium in direct proportion to the heat developed by the movable parts, and means for circulating a temperature controlling medium through said passages.

MAX E. LANGE.
MAX G. GOETZE.